US007495657B2

(12) United States Patent  (10) Patent No.: US 7,495,657 B2
Cheng  (45) Date of Patent: Feb. 24, 2009

(54) KEYBOARD

(75) Inventor: Yi-Tsung Cheng, Taipei Hsien (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 516 days.

(21) Appl. No.: 10/605,502

(22) Filed: Oct. 3, 2003

(65) Prior Publication Data

US 2005/0024337 A1    Feb. 3, 2005

(30) Foreign Application Priority Data

Jul. 31, 2003    (TW) .............................. 92120954 A

(51) Int. Cl.
    *B41J 5/00* (2006.01)
    *G09G 5/00* (2006.01)
    *G06F 3/02* (2006.01)
    *H03M 11/00* (2006.01)
    *H03K 17/94* (2006.01)

(52) U.S. Cl. ........................... 345/168; 341/22; 341/26; 341/34; 400/472

(58) Field of Classification Search ................ 341/22, 341/26, 34; 345/168; 400/472
See application file for complete search history.

(56) References Cited

U.S. PATENT DOCUMENTS

| 3,765,015 | A | | 10/1973 | Gruner |
| 3,973,256 | A | | 8/1976 | Stoesser et al. |
| 4,027,306 | A | * | 5/1977 | Hackmeister ................. 341/26 |
| 4,405,918 | A | * | 9/1983 | Wall et al. ..................... 341/26 |
| 4,414,538 | A | * | 11/1983 | Schnizlein .................... 341/26 |
| 5,386,584 | A | | 1/1995 | Verstegen et al. |
| 5,585,792 | A | | 12/1996 | Liu et al. |
| 5,700,194 | A | | 12/1997 | Hsien |
| 5,872,561 | A | * | 2/1999 | Figie et al. ................... 345/168 |
| 6,198,820 | B1 | | 3/2001 | Tetsushi |
| 6,265,993 | B1 | * | 7/2001 | Johnson ....................... 341/22 |
| 2002/0171564 | A1 | | 11/2002 | Jam |

FOREIGN PATENT DOCUMENTS

| EP | 0478141 A2 | 4/1992 |
| JP | 53-024729 | 3/1978 |
| JP | 54-032956 | 3/1979 |
| JP | 60-110028 | 6/1985 |
| JP | 62251917 A * | 11/1987 |
| JP | S62-251917 A | 11/1987 |
| JP | 04-051308 | 2/1992 |
| WO | WO-99/62180 | 12/1999 |

* cited by examiner

*Primary Examiner*—Sumati Lefkowitz
*Assistant Examiner*—Alexander S. Beck
(74) *Attorney, Agent, or Firm*—Winston Hsu

(57) ABSTRACT

A keyboard includes a key module comprising at least one key cell with an output end which is selectively connected to a first voltage or a second voltage, a detect circuit electrically connected to the output end of the key cell for generating a control signal whenever the voltage on the output end of the key cell becomes the second voltage or the first voltage, a parallel-to-serial register electrically connected to the output end of the key module, and a processor electrically connected to the parallel-to-serial register and the detect circuit for controlling the parallel-to-serial register according to the control signal.

21 Claims, 3 Drawing Sheets

KEYBOARD

BACKGROUND OF INVENTION

1. Field of the Invention

The present invention relates to a keyboard, and more specifically, to a keyboard wherein a processor reads input data only when a key cell is pressed or released.

2. Description of the Prior Art

Please refer to FIG. 1 showing a block diagram of a conventional keyboard 10. The keyboard 10 includes a matrix key module 12 and a processor 14 electrically connected to the matrix key module 12. The matrix key module 12 includes a plurality of key cells arranged in matrix, and the processor 14 reads input signals on output ends $B_0$ to $B_7$ of the key cells within the matrix key module 12 by polling.

It is a disadvantage of the prior art that, whenever any key cell within the matrix key module 12 is pressed, the processor 14 needs to continuouslypoll the input signals on the output ends $B_0$ to $B_7$ of the key cells until every key cell within the matrix key module 12 is released. This continuous polling lowers the efficiency of the processor 14.

SUMMARY OF INVENTION

It is therefore a primary objective of the present invention to provide a keyboard wherein a processor reads input signals on an output end of a key cell within a key module only when any of the key cells within the key module are pressed or released.

Briefly summarized, a keyboard includes a key module comprising at least one key cell with an output end selectively connected to a first voltage or a second voltage, a detect circuit electrically connected to the output end of the key cell for generating a control signal whenever the voltage on the output end of the key cell becomes the second voltage or the first voltage, a parallel-to-serial register electrically connected to the output end of the key module, and a processor electrically connected to the parallel-to-serial register and the detect circuit for controlling the parallel-to-serial register according to the control signal. The processor controls the parallel-to-serial register to first do a parallel read of the input signals on the output end of the key cell, and then serially reads the input data input from the parallel-to-serial register.

These and other objectives of the present invention will no doubt become obvious to those of ordinary skill in the art after reading the following detailed description of the preferred embodiment that is illustrated in the various figures and drawings.

DETAILED DESCRIPTION

The keyboard according to the present invention controls a processor, which inputs signals from the key cells within a key module through a parallel-to-serial register. The processor inputs the key signals according to a control signal generated when a voltage in a capacitor changes, which occurs at the moment a detect circuit detects that a key cell within the key module has been pressed or released.

Figure 1:
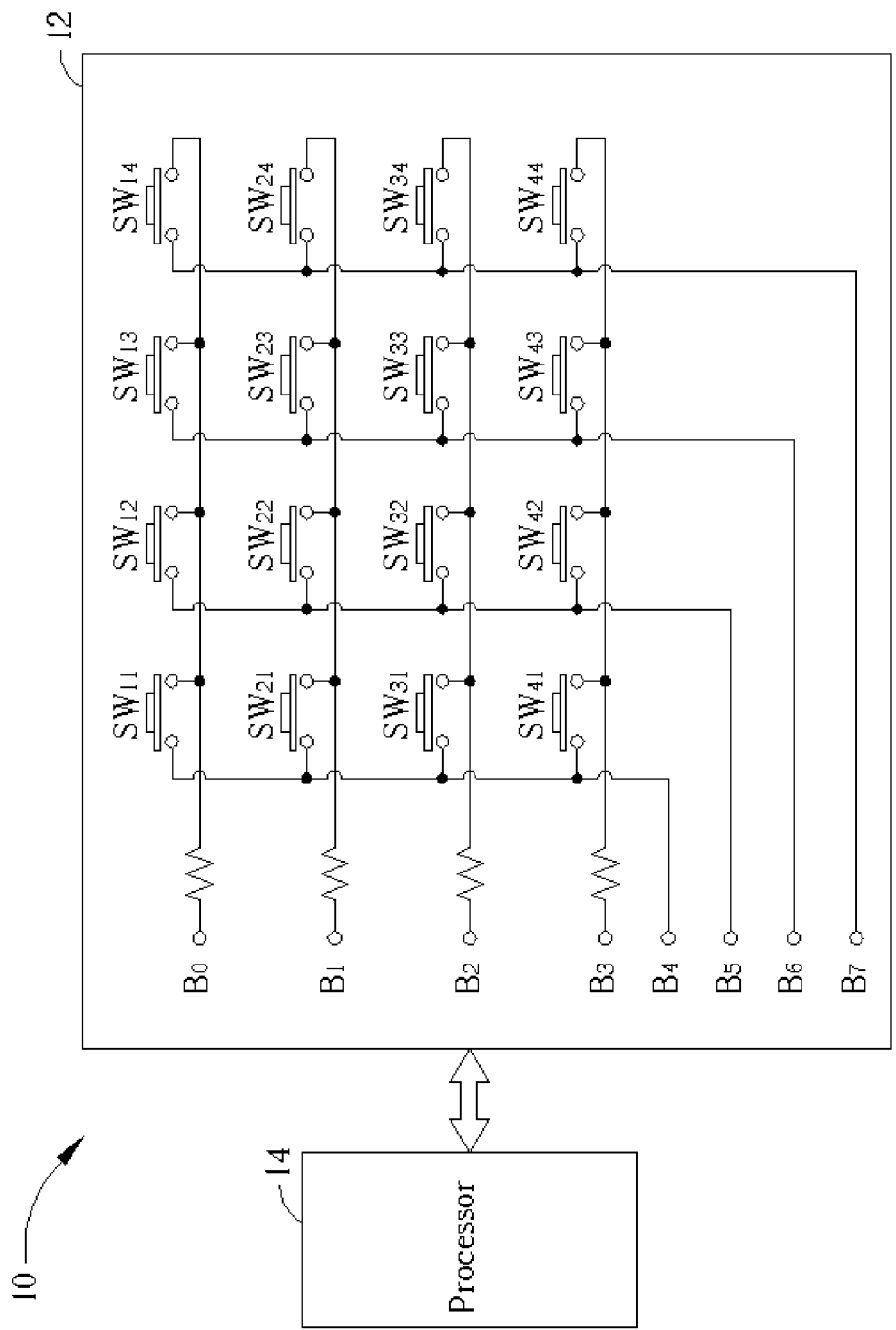
FIG. 1 is a block diagram of a conventional keyboard.
Figure 2:
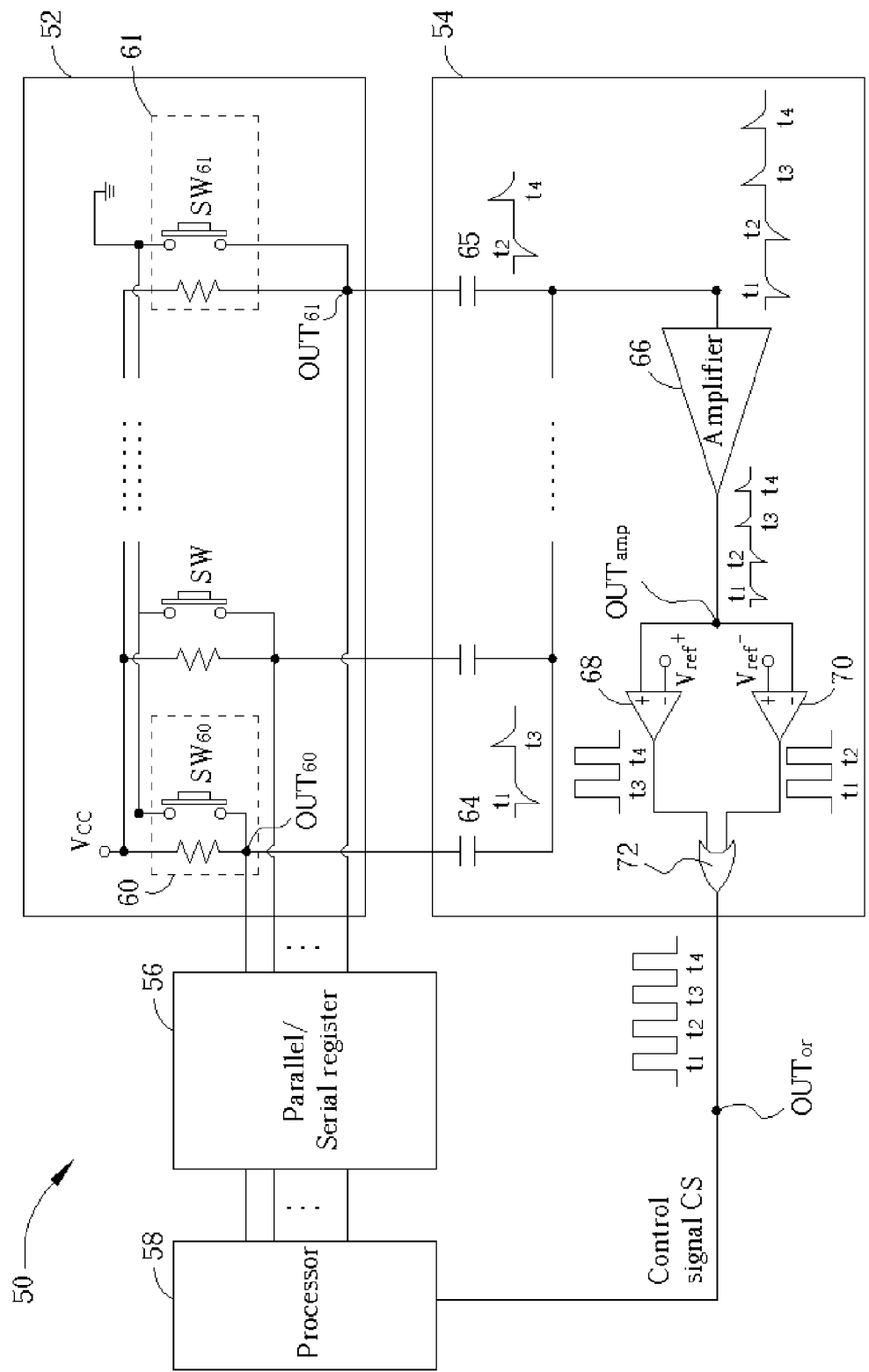
FIG. 2 is a block diagram of a keyboard according to the present invention.

Please refer to FIG. 2 showing a block diagram of a keyboard 50 according to the present invention. The keyboard 50 includes a key module 52 which has at least one key cell (for example, key cells 60, 61 in FIG. 2), a detect circuit 54 electrically connected to output ends $OUT_{60}$, $OUT_{61}$ of the key cells 60, 61 within the key module 52, and a parallel-to-serial register 56 electrically connected to output ends $OUT_{60}$, $OUT_{61}$ of the key cells 60, 61. A processor 58 is electrically connected to the parallel-to-serial register 56 and the detect circuit 54 for controlling the parallel-to-serial register 56 to read input data from the output ends $OUT_{60}$, $OUT_{61}$ of the key cells 60, 61 according to a control signal CS from the detect circuit 54.

The key cells 60, 61 within the key module 52 include switches $SW_{60}$, $SW_{61}$ respectively. The output end $OUT_{60}$ of the key cell 60 (as well as the output end $OUT_{61}$ of the key cell 61) is electrically connected to either a first voltage Vcc or a second voltage GND according to the opening and closing of the switch $SW_{60}$. That is, when the key cell 60 is pressed. the switch $SW_{60}$ is closed and the output end $OUT_{60}$ is electrically connected to the second voltage GND so that a logic low voltage $V_L$ is output. On the contrary, when the key cell 60 is released, the switch $SW_{60}$ is opened and the output end $OUT_{60}$ is electrically connected to the first voltage Vcc so that a logic high voltage $V_H$ is output. The logic high signal and the logic low signal on the output ends $OUT_{60}$, $OUT_{61}$ form the input signals to the parallel-to-serial register 56.

The detect circuit 54 includes one capacitor corresponding to each key cell within the key module 52 (as shown by capacitors 64, 65 corresponding to the key cells 60, 61 respectively within the key module 52 in FIG. 2). An amplifier 66 is electrically connected to the capacitors 64, 65 for amplifying the voltage in the capacitors 64, 65. Two comparators 68, 70 are electrically connected to the amplifier 66 for comparing the voltage output by the amplifier 66 and outputting the control signal when the voltage output from the output end $OUT_{amp}$ of the amplifier 66 is in a predetermined range. Finally, an OR gate 72 is electrically connected to the comparator 68, 70.

Figure 3:
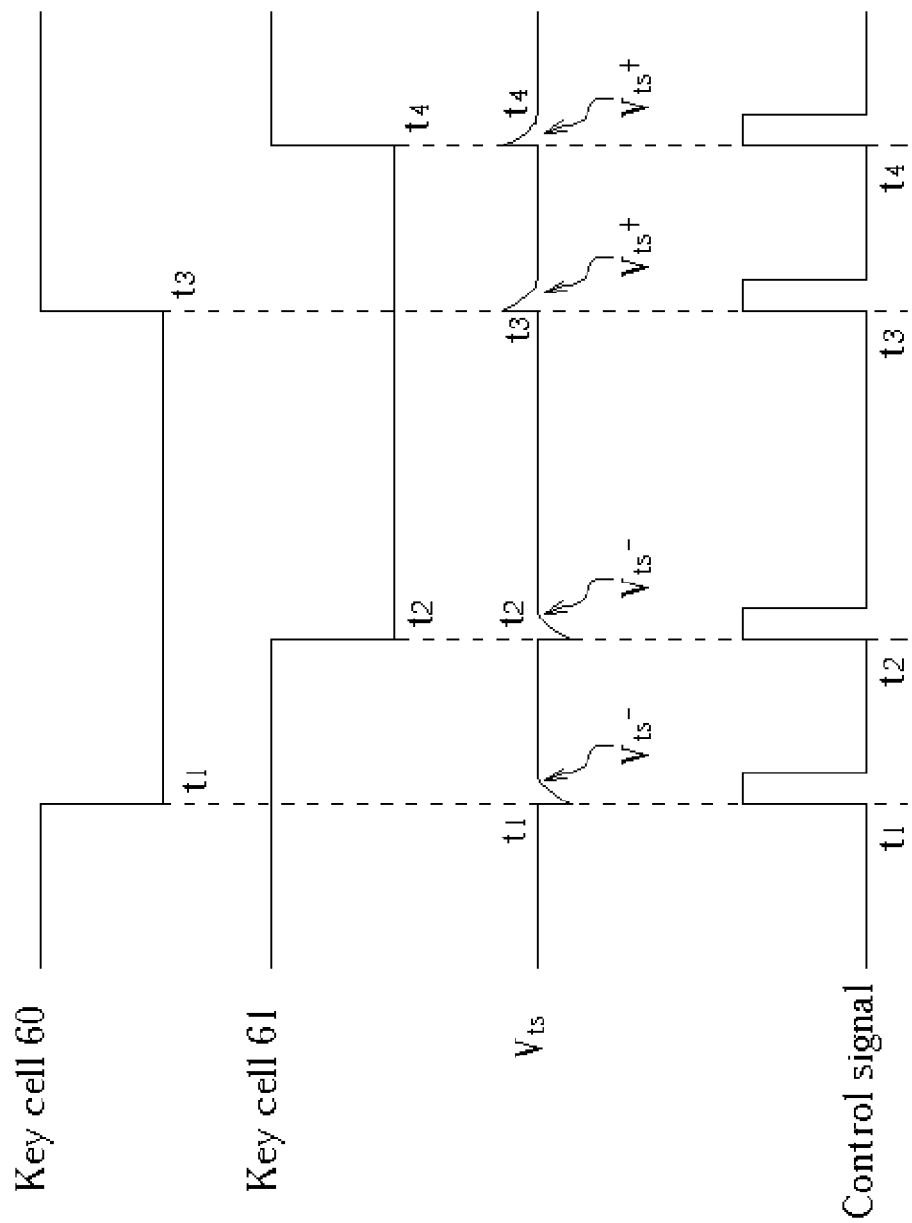
FIG. 3 is a waveform diagram of the transient voltage and the control signal detected by the detect circuit whenever the key cells are pressed or released.

At the moment when the key cell 60 (similar for key cell 61 or any other key cell) within the key module 52 is pressed or released, the switch $SW_{60}$ of the key cell 60 is accordingly closed (or switched on) or opened (or switched off), and the output end $OUT_{60}$ is accordingly electrically connected to the second voltage GND or the first voltage Vcc. In this situation, the detect circuit 54 detects a transient voltage $V_{ts}$ of 100-150 mV formed in the capacitor 64 (or the capacitor 65). Please refer to FIG. 3 showing a waveform diagram of the transient voltage $V_{ts}$ and the control signal CS in the capacitors 64, 65 detected by the detect circuit 54 whenever the key cells 60, 61 within the key module 52 of the key board 50 are pressed or released. As shown in FIG. 3. at the moment when the key cell 60 (similar for key cell 61) is pressed at time $t_1$ (or $t_2$), the switch $SW_{60}$ of the key cell 60 is closed, and the output end $OUT_{60}$ of the key cell 60 is connected to the second voltage GND (i.e. the input signal on the output end $OUT_{60}$ of the key cell 60 becomes a logic low voltage $V_L$.). In this situation, the detect circuit 54 detects a negative transient voltage $V_{ts}$ in the capacitor 64. On the other hand, at the moment when the key cell 60 (similar for key cell 61) is released at time $t_3$ (or $t_4$), the switch $SW_{60}$ of the key cell 60 is opened, and the output end $OUT_{60}$ of the key cell 60 is connected to the first voltage Vcc (i.e. the input signal on the output end $OUT_{60}$ of the key cell 60 becomes a logic high voltage $V_H$). In this situation, the detect circuit 54 detects a positive transient voltage $V_{ts+}$ in the capacitor 64. The amplifier 66 amplifies the positive transient voltage $V_{ts+}$ and the negative transient voltage $V_{ts-}$ and outputs the amplified positive transient voltage $V_{ts++}$ and the amplified negative transient voltage $V_{ts--}$ into an input end of the comparators 68, 70. In the present invention, the comparators 68, 70 are divided into a positive comparator 68 and a negative comparator 70. The detect circuit 54 outputs the control signal CS from an output end $OUT_{or}$ of the OR gate 72 either when the amplified positive transient voltage $V_{ts++}$ exceeds a positive reference voltage $V_{ref+}$ on the other input end of the positive comparator 68, or when the amplified negative transient voltage $V_{ts--}$ is lower than a negative reference voltage $V_{ref-}$ on the other input end of the negative comparator 70.

After receiving the control signal CS, the processor 58 controls the parallel-to-serial register 56 to first do a parallel input of the output ends of all the key cells within the key module 52, and then gradually inputs the input signals serially. For example, when receiving the control signal CS at time $t_1$, the processor 58 controls the parallel-to-serial register 56 to first do a parallel input of the input data (01) on the output ends $OUT_{60}$, $OUT_{61}$ of all of the key cells 60, 61, and then gradually inputs the input signal (01) serially. As another example, at times $t_2$, $t_3$, and $t_4$, the processor 58 controls the parallel-to-serial register 56 to first do a parallel input of the input data (00), (10), (11), and then gradually reads the input signals (00), (10), (11) serially. The processor 58 can execute specific operations according to these input signals or a variation of the input signals, which is the same as the prior art, so that a further description is hereby omitted.

In contrast to the prior art, the keyboard according to the present invention includes a key module, a detect circuit, a parallel-to-serial register and a processor. The detect circuit detects the variation between current input signals and previous input signals input by the key module, that is, the detect circuit detects whether any of the key cells within the key module is pressed or released. The processor inputs the current input signals only when the input signals change. Therefore, the keyboard according to the present invention solves the problem of the prior art that continuous polling is required whenever any key cell is pressed (e.g. from time $t_1$ to $t_4$ in FIG. 3), and thereby improves the efficiency of the processor.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A keyboard comprising:
a key module comprising a plurality of key cells each having an output end being selectively connected to one of a first voltage while being pressed and a second voltage while not being pressed;
a detect circuit electrically connected to the outputs end of the key cells for generating a control signal whenever one of the output end of the key cell becomes connected to the other of the second voltage and the first voltage, wherein the detect circuit comprises an amplifying circuit and a plurality of capacitors each having a first end being coupled to the output end of each of the key cells, respectively, and having a second end;
a parallel-to-serial register electrically connected to the output end of the key module; and
a processor electrically connected to the parallel-to-serial register and the detect circuit for controlling the parallel-to-serial register according to the control signal without polling for a status of the key cells during a time period between any key cell being connected to the first voltage and then connected to the second voltage;
wherein the second ends of the capacitors are connected together and coupled to the amplifying circuit, and the amplifying circuit is configured for amplifying a voltage in one of the capacitors and has an output end for outputting the amplified voltage; and
wherein the control signal is generated according to the amplified voltage.

2. The keyboard of claim 1, wherein the detect circuit further comprises a set of comparators electrically connected to the amplifying circuit, for comparing whether the amplified voltage is in a predetermined range and generating the control signal accordingly.

3. The keyboard of claim 2, wherein the set of comparators comprises a positive comparator for generating the control signal when the voltage output from the output end of the amplifying circuit exceeds a positive reference voltage, and a negative comparator for generating the control signal when the voltage output from the output end of the amplifying circuit is lower than a negative reference voltage.

4. The keyboard of claim 3, wherein the detect circuit further comprises an OR gate with its input ends electrically connected to the output ends of the set of comparators, and its output end for outputting the control signal.

5. The keyboard of claim 1, wherein the key module further includes a plurality of key cells each having an output end connected to one of the first voltage and the second voltage; and the parallel-to-serial register is electrically connected to the output end of each of the key cells in the key module for reading a parallel input being the voltages at the output end of all the key cells and converting the parallel input into a serial representation for output to the processor.

6. The keyboard of claim 1, wherein the detect circuit is further for asserting the control signal only while detecting a transient voltage being greater than a reference voltage, the transient voltage corresponding to a change in voltage at the output end of the key cell and being a voltage spike that occurs at the moment the output end of the key cell becomes connected to the other of the second and the first voltage.

7. A keyboard comprising:
a key module comprising at least one key cell with an output end;
a detect circuit electrically connected to the output end of the key cell for detecting a transient voltage at the moment when the key cell is pressed and released and generating a corresponding control signal;
a parallel-to-serial register electrically connected to the output end of the key module; and
a processor electrically connected to the parallel-to-serial register and the detect circuit for controlling the parallel-to-serial register only upon reception of the control signal without polling for a status of the key cells during a time period between any key cell being pressed and then released.

8. The keyboard of claim 7, wherein the detect circuit comprises at least one capacitor corresponding to and electrically connected to the at least one key cell within the key module for detecting the transient voltage.

9. The keyboard of claim 8, wherein the detect circuit further comprises a comparator electrically connected to the capacitor for generating the control signal by comparing the transient voltage with a reference voltage.

10. The keyboard of claim 9, wherein the detect circuit further comprises an amplifier electrically connecting the capacitor and the comparator for amplifying the transient voltage.

11. The keyboard of claim 8, wherein the detect circuit further comprises a set of comparators electrically connected to the capacitor for generating the control signal by comparing the transient voltage with reference voltages.

12. The keyboard of claim 11, wherein the set of comparators comprises a positive comparator and a negative comparator for comparing the transient voltage with a positive reference voltage and a negative reference voltage, respectively, to generate the control signal.

13. The keyboard of claim 12, wherein the detect circuit further comprises an amplifier electrically connecting the capacitor and the set of comparators for amplifying the transient voltage.

14. The keyboard of claim 12, wherein the detect circuit further comprises an OR gate electrically connected to the set of comparator for outputting the control signal.

15. The keyboard of claim 14, wherein the detect circuit further comprises an amplifier electrically connecting the capacitor and the set of comparators for amplifying the transient voltage.

16. The keyboard of claim 7, wherein the key module further includes a plurality of key cells each having an output end; and the parallel-to-serial register is electrically connected to the output end of each of the key cells in the key module for reading a parallel input being voltages at the output end of all the key cells and converting the parallel input into a serial representation for output to the processor.

17. The keyboard of claim 7, wherein the detect circuit is further for asserting the control signal only while detecting the transient voltage being greater than a reference voltage, the transient voltage being a voltage spike that occurs at the moment the key cell is pressed and at the moment the key cell is released.

18. A keyboard comprising:
a key module comprising at least one key cell with an output end;
a detect circuit electrically connected to the output end of the key cell for detecting a transient voltage at the moment when the key cell is pressed and released and generating a control signal;
a parallel-to-serial register electrically connected to the output end of the key module for inputting input data from the output end when the key cell is pressed and released; and
a processor electrically connected to the parallel-to-serial register and the detect circuit for controlling the parallel-to-serial register and reading the input data therein only upon reception of the control signal without polling for a status of the key cells during a time period between any key cell being pressed and then released.

19. The keyboard of claim 18, wherein the key module further includes a plurality of key cells each having an output end; and the parallel-to-serial register is electrically connected to the output end of each of the key cells in the key module for inputting parallel input data being voltages at the output end of all the key cells and converting the parallel input data into a serial representation for output to the processor.

20. The keyboard of claim 18, wherein the detect circuit is further for asserting the control signal only while detecting the transient voltage being greater than a reference voltage, the transient voltage being a voltage spike that occurs at the moment the key cell is pressed and at the moment the key cell is released.

21. A keyboard comprising:
a plurality of key cells each having an output end connecting to either a first voltage or a second voltage;
a plurality of capacitors including one capacitor with a first end being coupled to the output end of each of the key cells;
an amplifier being coupled to a second end of each of the capacitors;
a first comparator having a positive input terminal coupled to an output end of the amplifier and having a negative input terminal coupled to a positive reference voltage;
a second comparator having a negative input terminal coupled to the output end of the amplifier and having a positive input terminal coupled to a negative reference voltage;
a logical OR gate having input ends coupled to output ends of the first and second comparators and having an output end being a control signal for being coupled to a processor to indicate that one of the key cells has been pressed and to indicate that one of the key cells has been released; and
a parallel-to-serial register having parallel input lines coupled to the output end of each of the key cells and having a serial output line for being coupled to the processor, without the processor polling for a status of the key cells during a time period between any key cell being pressed and then released.

* * * * *